United States Patent [19]

Blanc

[11] Patent Number: 5,229,153
[45] Date of Patent: Jul. 20, 1993

[54] PROCESS FOR FLAVORING A SOLUBLE COFFEE POWDER

[75] Inventor: Maurice Blanc, Morges, Switzerland

[73] Assignee: Nestec S.A., Vevey, Switzerland

[21] Appl. No.: 852,696

[22] Filed: Mar. 17, 1992

[30] Foreign Application Priority Data

Apr. 17, 1991 [CH] Switzerland .................... 1157/91

[51] Int. Cl.$^5$ ........................... A23F 5/16; A23F 5/48
[52] U.S. Cl. .................... 426/386; 426/387; 426/388; 426/594
[58] Field of Search ............... 426/386, 387, 388, 594

[56] References Cited

U.S. PATENT DOCUMENTS

| | | | |
|---|---|---|---|
| 3,769,032 | 10/1973 | Lubsen et al. | 426/386 X |
| 3,991,223 | 11/1976 | Baron et al. | |
| 4,119,736 | 10/1978 | Howland et al. | |
| 4,556,575 | 12/1985 | Katz et al. | 426/386 X |

*Primary Examiner*—Joseph Golian
*Attorney, Agent, or Firm*—Vogt & O'Donnell

[57] ABSTRACT

Aromas, carbon dioxide and water obtained from roasted coffee are condensed into a frost. An oil is mixed with the frost and subjected to sublimate the carbon dioxide from the oil and frost mixture, and then the mixture is melted to obtain an oil phase and an aqueous phase. The oil phase is separated from the aqueous phase, and the aqueous phase is contacted with an oil to transfer aromas to the oil which then is incorporated into a soluble coffee powder.

5 Claims, No Drawings

PROCESS FOR FLAVORING A SOLUBLE COFFEE POWDER

BACKGROUND OF THE INVENTION

This invention relates to a process for flavoring a soluble coffee powder.

More particularly, the present invention relates to a process of this type in which a flavored oil is incorporated in soluble coffee powder to obtain a flavor enhanced product similar in flavor to a roasted coffee.

Soluble coffee powder is conventionally produced by freeze-drying or spray-drying after evaporation of a coffee extract obtained by countercurrent percolation of an extraction liquid through cells filled with ground roasted coffee.

One of the major problems of this type of process lies in the fact that the product obtained does not have the flavor of a roasted coffee which is particularly due on the one hand, to the extraction process, and on the other hand, to the steps of evaporation and freeze-drying or spray-drying which inevitably involve significant losses of flavor.

Various solutions have been proposed in which an oil, generally a coffee oil, is enriched with coffee aromas and then sprayed onto the soluble coffee powder or incorporated in a jar filled with soluble coffee powder.

The principal aroma source known and used for this purpose is the aromas released from ground roasted coffee.

Thus, French Patent Application Publication No. 2,336,088, for example, describes a process in which an inert gas circulates through a ground roasted coffee. This inert gas becomes charged with aromas, and a frost is formed by condensation of the carbon dioxide entrained, moisture and aromas. This frost is then contacted with an oil under predetermined temperature and pressure conditions so that the oil recovers part of the aromas present in the frost. The oil obtained may then be incorporated in a soluble coffee powder.

Unfortunately, it has been known for some time that coffee aroma is fairly unstable and becomes even more unstable when the coffee aroma is separated from its natural substrate. Thus, the practical application of the process described above sometimes leads fairly rapidly to the development of aromatic notes remote from the original aroma, the stability of the end product depending, in particular, upon the structure of the soluble coffee powder, as also described in U.S. Pat. No. 3,769,032.

Various attempts have been made to dissolve only a fraction of the aromas present in the frost in the oil. Thus, one process of this type is known from European Pat. No. 215 164, the main disadvantage of this process being that it is difficult to carry out.

SUMMARY OF THE INVENTION

The problem addressed by the present invention was to provide a simple process for fractionating the aromas present in a frost produced by the condensation of carbon dioxide charged with roasted coffee aromas and moisture and with which it would be possible to incorporate only part of the aromas present in the frost in an oil.

Accordingly, the present invention relates to a process for flavoring a soluble coffee powder by incorporation of an oil enriched with coffee aromas in a soluble coffee powder, comprising the following steps:

a) a frost is produced by the condensation of carbon dioxide charged with roasted coffee aromas and with water, b) the frost obtained is then contacted with a first oil and sublimated, c) the oily phase is eliminated, d) the residual aqueous phase is contacted with a second oil, e) the oily phase thus obtained is incorporated in a soluble coffee powder.

DETAILED DESCRIPTION OF THE INVENTION

A frost charged with coffee aromas emanating from the cryogenic condensation of carbon dioxide is contacted with a coffee oil, although any other oil would be suitable, and sublimated.

All things being equal, the higher the temperature at which the roasted coffee aromas are desorbed, the higher the aroma content of the frost.

The oil used for contacting with the frost may be a liquid oil. An emulsion is formed between the oil and the aqueous phase during melting of the solid aqueous phase present in the frost which follows sublimation of the carbon dioxide, the residual aqueous phase and the oily phase then being separated, for example by centrifugation.

However, it has been found that, during sublimation of the carbon dioxide in contact with the liquid oil, aromas are occasionally entrained by degassing of the carbon dioxide which can cause problems for the rest of the process. In one embodiment of the invention, therefore, the frost is contacted with an oil which has been frozen and granulated. These two products are thus thoroughly mixed so that the losses of aromas which would be caused by stirring of a liquid oil and a frost are minimized.

The oil/frost mixture is then sublimated for about 48 hours at $-40°$ C. and then defrosted at ambient temperature and finally heated to $40°$ C. before being centrifuged to form a first oily phase and a residual aqueous phase.

The quantity of aromas transferred from the frost to the oil is dependent on the ratio by weight of oil to frost. The lower this ratio, the smaller the quantity transferred to the oil, but the higher the concentration of aromas in the oil.

The step in which an oil and a frost are contacted is carried out to remove certain aromas capable of producing a deterioration in the organoleptic qualities of the end product.

The compounds transferred to the oil are mainly furans and pyrroles and also such compounds as thiophenes which are considered to be responsible for the deterioration in the roasted coffee aromas.

In order to eliminate or at least substantially to reduce the quantity of these aromas initially present in the frost, it was decided to use a ratio by weight of oil to frost of less than 0.15 which also ensures that desired aromas are not excessively removed from the residual aqueous phase. Thus, even if it is primarily the unstable aromas which are transferred to the oil, they are not the only aromas to be thus transferred.

This accounts for the fact that the oil-to-frost ratio of this step of the process according to the invention is significantly different from that characterizing the prior art in which the oil, after being contacted with the frost, is the oil charged with aromas which will be directly used in the process for flavoring soluble coffee powder. It is thus necessary to transfer the largest possible quantity of aromas from the frost to the oil so that ratios by weight of oil to frost of greater than 0.5 are used.

The oily phase produced in the process according to the invention is then eliminated while the residual aqueous phase is contacted with a second oil.

In this step (the undesirable compounds having been eliminated in the previous step), the largest possible quantity of aromas has to be transferred from this residual aqueous phase to the second oil However, in order not to obtain too low a concentration of aromas in the oil, which is equivalent to a better transfer and hence to as high a ratio of oil to residual aqueous phase as possible, the ratio by weight of the oil to the aqueous phase is greater than 1, and it is preferable to adjust the ratio by weight of oil to aqueous phase to a value of 1.3 to 2:1.

It is thus possible in the process according to the invention, by varying the ratios by weight of first oil to frost and second oil to residual aqueous phase and also the temperature at which the roasted coffee aromas are desorbed during the cryogenic condensation phase, to obtain an oil charged with stable coffee aromas of which the exact aroma composition can be modulated.

EXAMPLES

The invention is illustrated by the following Examples wherein the total organic carbon content of the volatile fraction of an oil (expressed in mg per 100 g oil), which is set forth in the Examples below, is dependent on the aroma content of the oil and thus reflects the richness of the oil in aromas.

COMPARISON EXAMPLE

This Example is a Comparison Example illustrating the prior art.

1652 g frost were produced from 315 kg roasted coffee. The frost was then contacted with 808 g coffee oil. After sublimation, defrosting and centrifugation, 727 g aromatic oil were obtained.

The total organic carbon content of this oil was 2019.

EXAMPLE 1

2268 g frost were produced from 310 kg roasted coffee at a desorption temperature of 55° C. The frost was then contacted with 200 g coffee oil. A residual aqueous phase of 174 g was obtained and was itself contacted with 348 g of a second oil to give 315 g aromatic oil having a total organic carbon content of 1763.

EXAMPLE 2

1800 g frost were produced from 315 kg roasted coffee at a desorption temperature of 55° C. The frost was contacted with 200 g of a first oil. A residual aqueous phase of 191 g was contacted with 384 g of a second oil to give 323 g of an aromatic oil having a total organic carbon content of 1949.

EXAMPLE 3

2730 g frost were produced from 315 kg roasted coffee at desorption temperature of 67° C. The frost was contacted with 300 g oil. A residual aqueous phase of 440 g was obtained and was contacted with 572 g of a second oil. 520 g of an aromatic oil having a total organic carbon content of 1613 were finally obtained.

TABULAR COMPARISON OF RESULTS

The following summary Table illustrates the development with time of a soluble coffee powder onto which an aromatic oil has been sprayad.

To this end, a flavor mark was awarded to the various coffees obtained by spraying of the aromatic oils produced in the Comparison Example. These Examples were selected because they have very similar total organic carbon contents and hence, from the outset, aromas of identical strength.

The following Table thus illustrates the development with time of the flavour marks given to each of the coffees obtained with an oil according to Example 1 (comparison) and Example 2 (invention).

| Time (months) | Flavor mark of a coffee obtained with the comparison oil of the comparison Example | Flavor mark of a coffee obtained with the oil of Example 2 according to the invention |
| --- | --- | --- |
| 0 | 6.6 | 6.6 |
| 1 | 5.3 | 6.4 |
| 2 | 6.0 | 6.7 |
| 3 | 5.5 | 6.0 |
| 4 | 5.1 | 6.3 |
| 6 | 4.8 | 5.9 |
| 9 | 4.6 | 5.5 |

It can thus clearly be seen that the coffee obtained with the oil of the process according to the invention has much more stable aromatic characteristics, retaining most of its characteristics during storage for 4 months and undergoing only a slight deterioration in those characteristics after storage for 9 months.

I claim:

1. A process for recovering aromas from roast and ground coffee comprising:
   condensing carbon dioxide, aromas and water obtained from roasted coffee to obtain a frost;
   mixing an oil with the frost to obtain an oil and frost mixture wherein the oil and frost are in amounts in a ratio of oil to frost of less than 0.15 by weight;
   sublimating the mixture to sublimate carbon dioxide from the mixture;
   melting the sublimated mixture and obtaining an oil phase and an aqueous phase;
   separating the oil phase from the aqueous phase;
   contacting the aqueous phase with an oil, wherein the oil and aqueous phase are in amounts in a ratio of oil to aqueous phase of greater than 1 by weight, to transfer aromas from the aqueous phase to the oil and obtain an oil phase and an aqueous phase; and
   incorporating the oil phase into a soluble coffee powder.

2. A process according to claim 1 wherein the oil contacted with the aqueous phase is in an amount in a ratio of oil to aqueous phase of from 1.3:1 to 2:1 by weight.

3. A process according to claim 1 wherein the oil mixed with the frost is in a form of a frozen granulate.

4. A process according to claim 2 wherein the oil mixed with the frost is in a form of a frozen granulate.

5. A process according to claim 1 or 2 or 3 or 4 wherein the oil mixed with the frost is coffee oil.

* * * * *

UNITED STATES PATENT AND TRADEMARK OFFICE
CERTIFICATE OF CORRECTION

PATENT NO. : 5,229,153
DATED : July 20, 1993
INVENTOR(S) : Maurice BLANC

It is certified that error appears in the above-identified patent and that said Letters Patent is hereby corrected as shown below:

In line 3 of the ABSTRACT, after "subjected", insert --sublimation to-- so that the line reads "...subjected to sublimation to ...".

Column 4, line 10, after "Comparison Example", insert --and Example 2--.

Column 4, lines 16-17, delete "Example 1 (comparison)" and insert --the Comparison Example--.

Signed and Sealed this

Eighth Day of February, 1994

Attest:

BRUCE LEHMAN

*Attesting Officer*  *Commissioner of Patents and Trademarks*